(12) United States Patent
Gilbert

(10) Patent No.: US 8,878,398 B2
(45) Date of Patent: Nov. 4, 2014

(54) SYSTEM COMPRISING A PLURALITY OF CONTROLLERS AND ASSOCIATED METHOD

(75) Inventor: Jerome Gilbert, Levallois-Perret (FR)

(73) Assignee: Ergylink, Levallois-Perret (FR)

( * ) Notice: Subject to any disclaimer, the term of this patent is extended or adjusted under 35 U.S.C. 154(b) by 940 days.

(21) Appl. No.: 13/023,810

(22) Filed: Feb. 9, 2011

(65) Prior Publication Data

US 2011/0193424 A1    Aug. 11, 2011

(30) Foreign Application Priority Data

Feb. 9, 2010   (FR) ..................................... 10 00545

(51) Int. Cl.
*H02H 11/00* (2006.01)
*G06F 1/18* (2006.01)
*G06F 1/26* (2006.01)

(52) U.S. Cl.
CPC ........ *G06F 1/189* (2013.01); *G06F 2213/0038* (2013.01); *G06F 1/266* (2013.01)
USPC .............................................. 307/326; 307/1

(58) Field of Classification Search
USPC ......................... 307/1, DIG. 1, 5, 38, 42, 326
See application file for complete search history.

(56) References Cited

U.S. PATENT DOCUMENTS

2005/0099314 A1\* 5/2005 Aisa .............................. 340/637
2006/0192434 A1\* 8/2006 Vrla et al. ....................... 307/64

FOREIGN PATENT DOCUMENTS

EP          0370921          5/1990

OTHER PUBLICATIONS

Wojcik et al., "The Design of an Optical Fiber Power Supplying Link", Proceedings of the SPIE, Mar. 12, 1991, pp. 292-297, vol. 1504, SPIE, Bellingham, VA, USA, XP007916076.
FR Search Report dated Dec. 7, 2010 from corresponding FR1000545.

\* cited by examiner

*Primary Examiner* — Carlos Amaya
(74) *Attorney, Agent, or Firm* — Young & Thompson

(57) ABSTRACT

An electronic system includes at least two subassemblies connected through an assembly of at most three conductors (3), each subassembly (1, 2) including at least one microprocessor. In its preferred alternative embodiments, it allows the connection of electronic subassemblies through a cable containing two or three conductors. Further, in certain alternatives it allows galvanic insulation to be achieved between the subassemblies. The galvanic insulation obtained has technical characteristics capable of complying statutory requirements as regards electrical safety without resorting to cables complying the statutory requirements.

17 Claims, 9 Drawing Sheets

Figure 1:
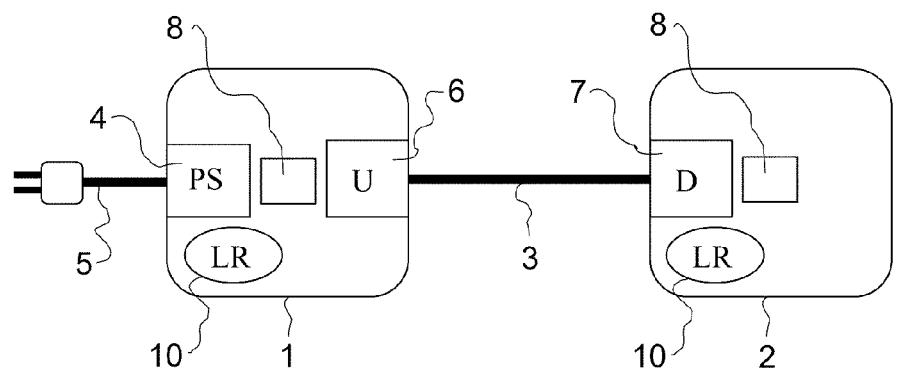

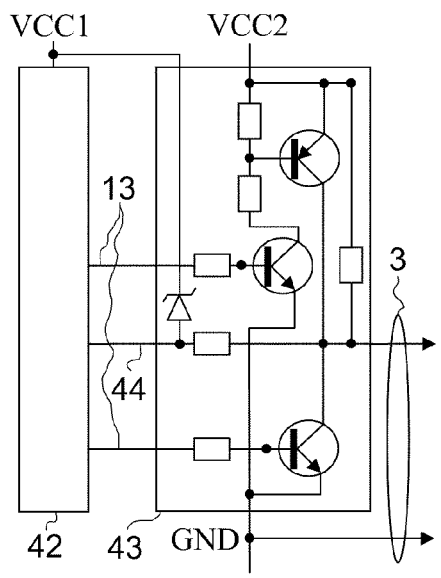
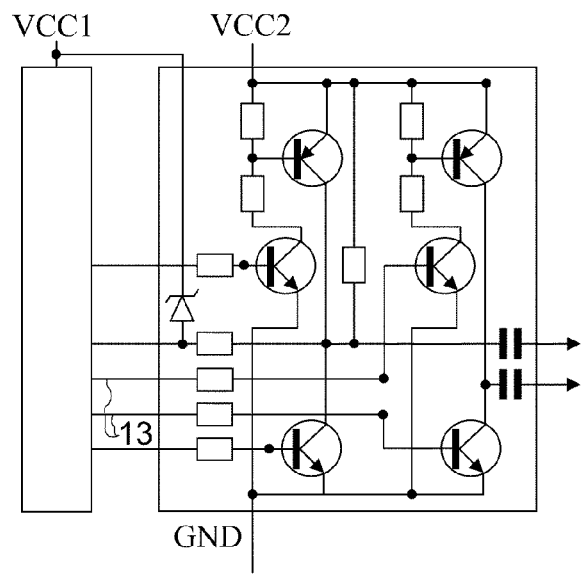
FIG. 20      FIG. 21
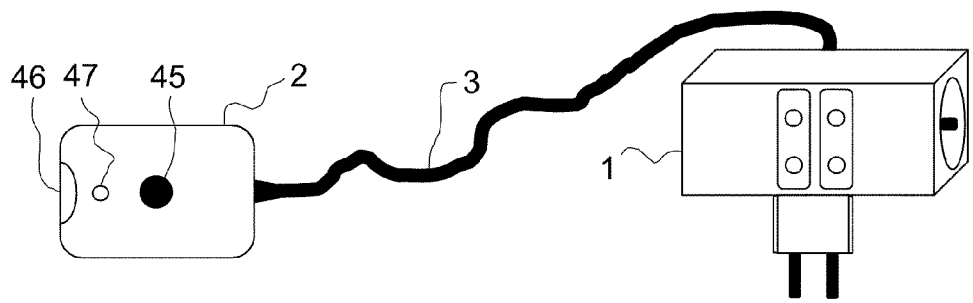
FIG. 22
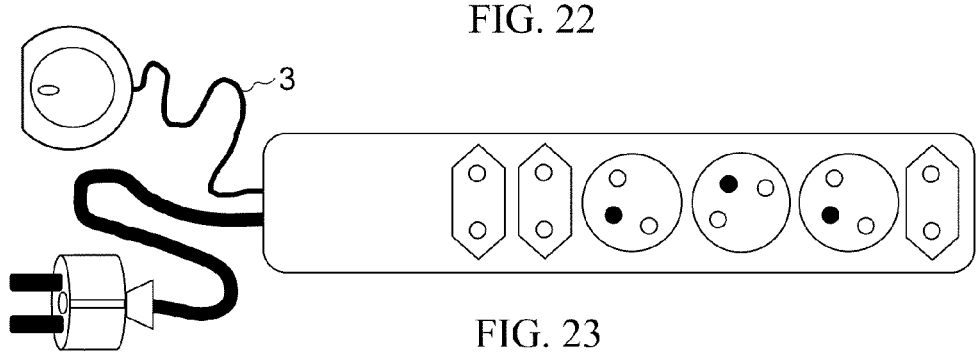
FIG. 23
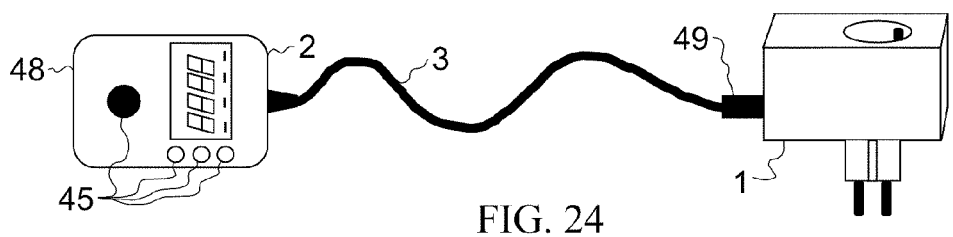
FIG. 24

SYSTEM COMPRISING A PLURALITY OF CONTROLLERS AND ASSOCIATED METHOD

TECHNICAL FIELD

The present invention is located in the field of electronics and more particularly in the field of the architecture of systems comprising several controllers.

STATE OF THE PRIOR ART

The invention relates to electronic systems comprising at least two subassemblies connected through an assembly of conductors. The assembly of conductors used within the scope of the invention as well as its interfaces within said subassemblies, are capable of transmitting energy and information. The invention is particularly directed to the reduction in the number of conductors comprised in the assembly of conductors used for connecting constitutive subassemblies of systems. These may for example be systems forming appliances such as those disclosed in the patents and patent applications FR0605627, FR0903817, FR0904293 of the same inventor. The solutions of the state of the art which may be used in this context are for example connections compliant with the I2C, USB or SPI standards but they require the connection of at least four conductors. In the field of semiconductors, the so-called <<one-wire bus>> solution is also known, disclosed in U.S. Pat. No. 5,210,846 which is directed to the connection of a plurality of integrated circuits to a microcontroller. In the field of automatic operations for the building industry the solution disclosed by patent FR 8815053 is also known for connecting a technical management automaton to remote modules through a two-wire line. Solutions are also known such as those disclosed in patent U.S. Pat. No. 5,635,896 which are based on the modulation of the power supply current absorbed by a remote subassembly.

The known solutions require connections through cables comprising more than three conductors or are limited in capability of transferring energy so that they are unsuitable for powering at least one remote subassembly comprising a microprocessor and optionally its local resources. The other known solutions require a powerful power supply laid out so as to withstand short-circuits, as well as the application of complex and costly interfaces in the module. Among the known solutions, some of them are unsuitable for allowing transmission of information in the direction from powering subassembly to powered subassembly.

In addition to the fact that each additional wire in a cable introduces additional direct and indirect costs, increases the diameter thereof and its rigidity, everything moreover being equal, all these drawbacks are considerably increased in the case when said main subassembly is powered by the mains and that consequently the indispensable electric safety standards impose resorting to cables approvable according to mandatory standards or to traditional galvanic insulation solutions having other drawbacks.

SHORT DISCUSSION OF THE INVENTION

The object of the present invention is to find at least a partial remedy to the problems mentioned earlier by proposing a simpler, more economical solution to apply and which further is more energy-sparing for making systems from several subassemblies, each comprising a microprocessor and said subassemblies being connected through wired means comprising at most three conductors. The simplicity and the low application cost partly stem from the fact that the invention may be applied by only using input/output ports of components currently used for ensuring both the energy transfer aspect and the information transmission aspect. Thus, such commonplace components as standard 8 bit microcontrollers may be used for implementing the invention, this by only using their most basic and universal on-board peripheral which is the input/output port. In a more elaborate alternative of the invention, at least two subassemblies of the system are galvanically insulated with the purpose of ensuring electric safety for persons. In many alternative embodiments, with the invention, it is further possible to meet electromagnetic compatibility normative constraints, both in emission and in immunity without having to resort to shielded cables.

SHORT DESCRIPTION OF THE DRAWINGS

Figure 2:
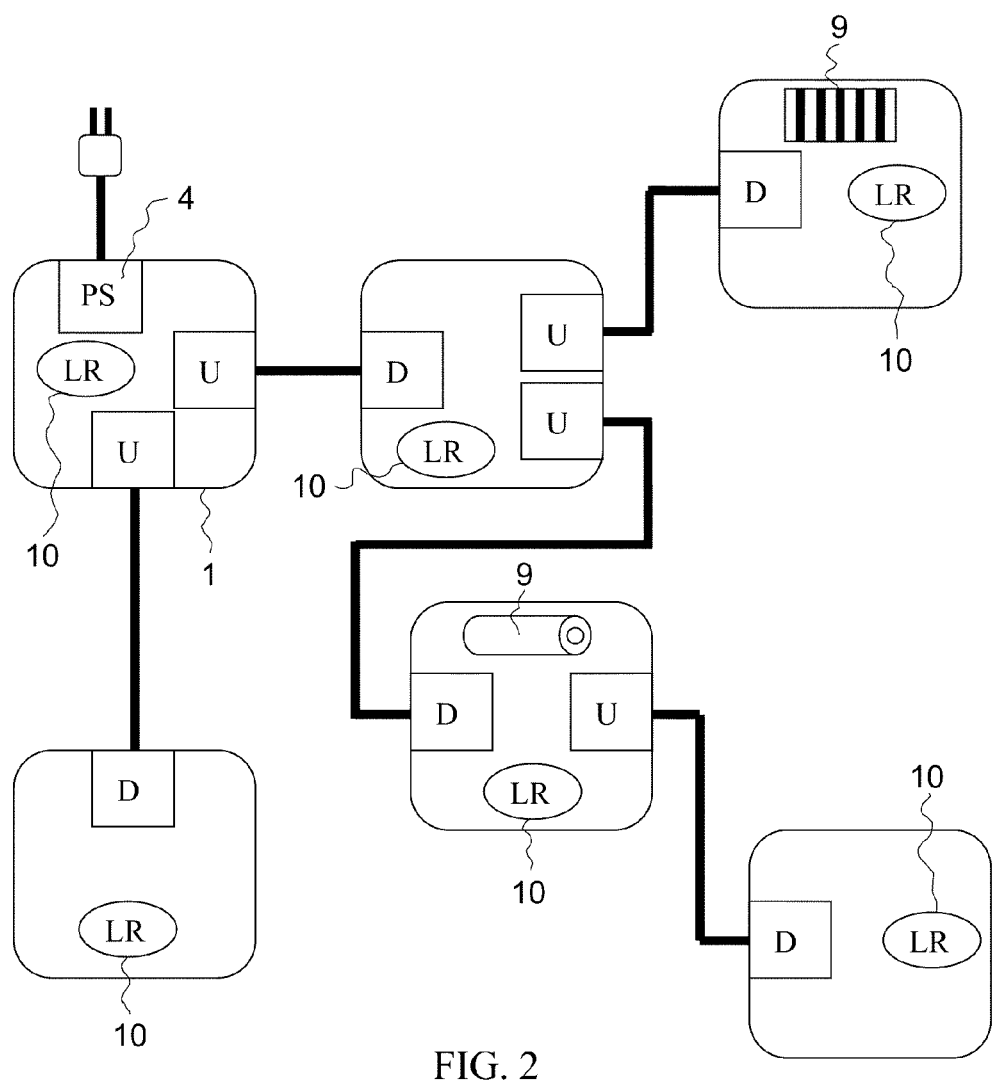
Figure 3:
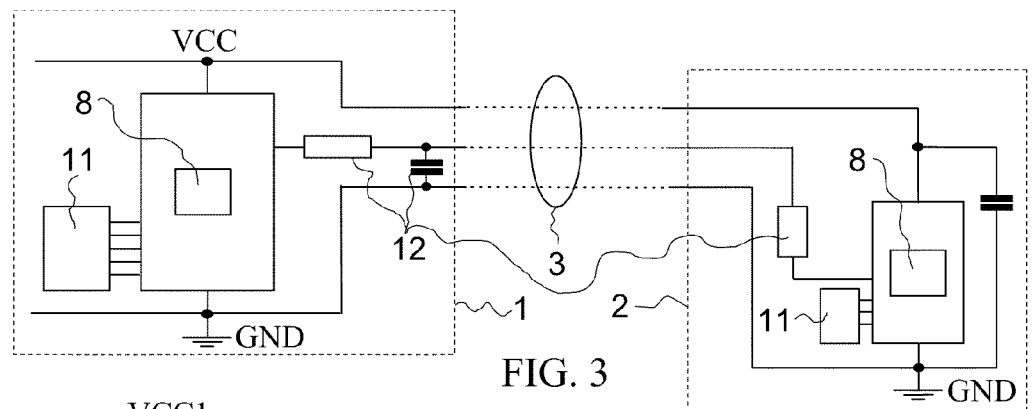
Figure 4:
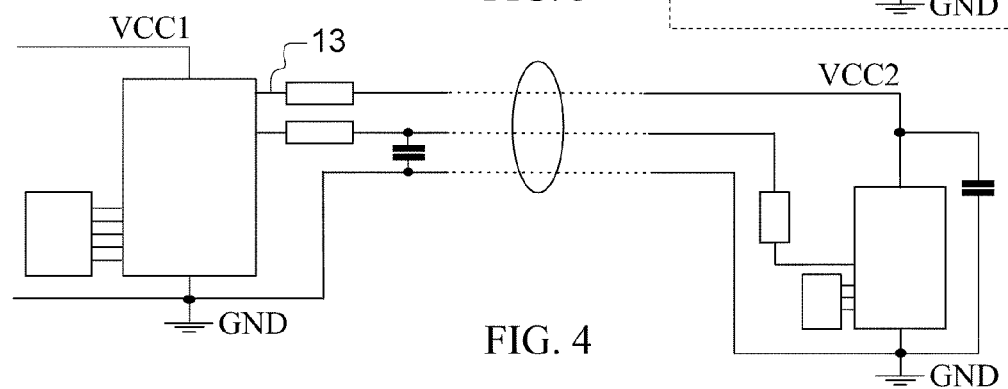
Figure 5:
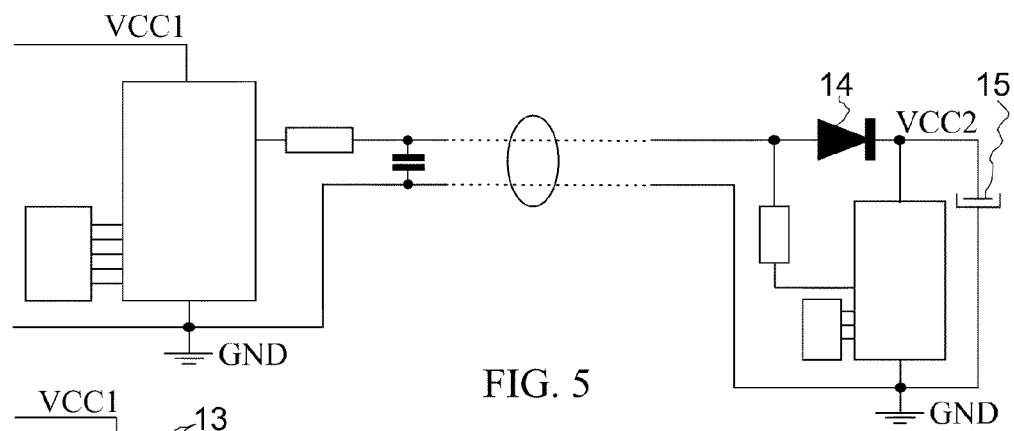
Figure 6:
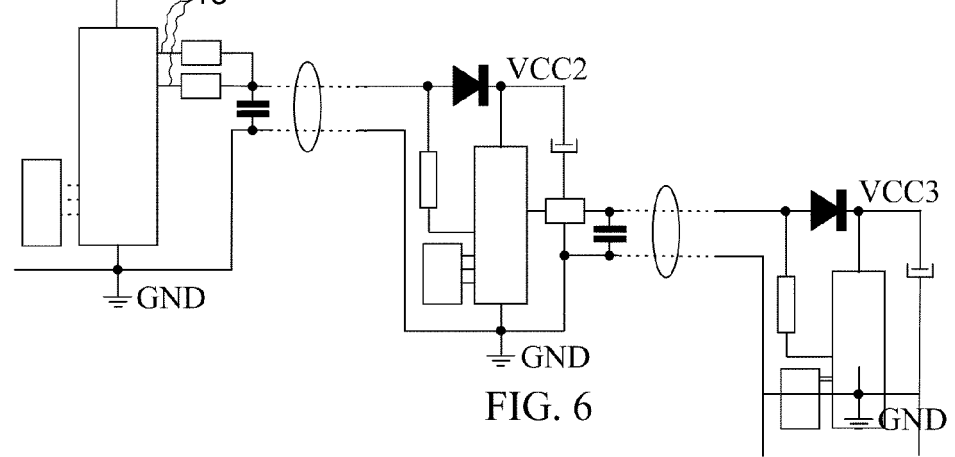
Figure 7:
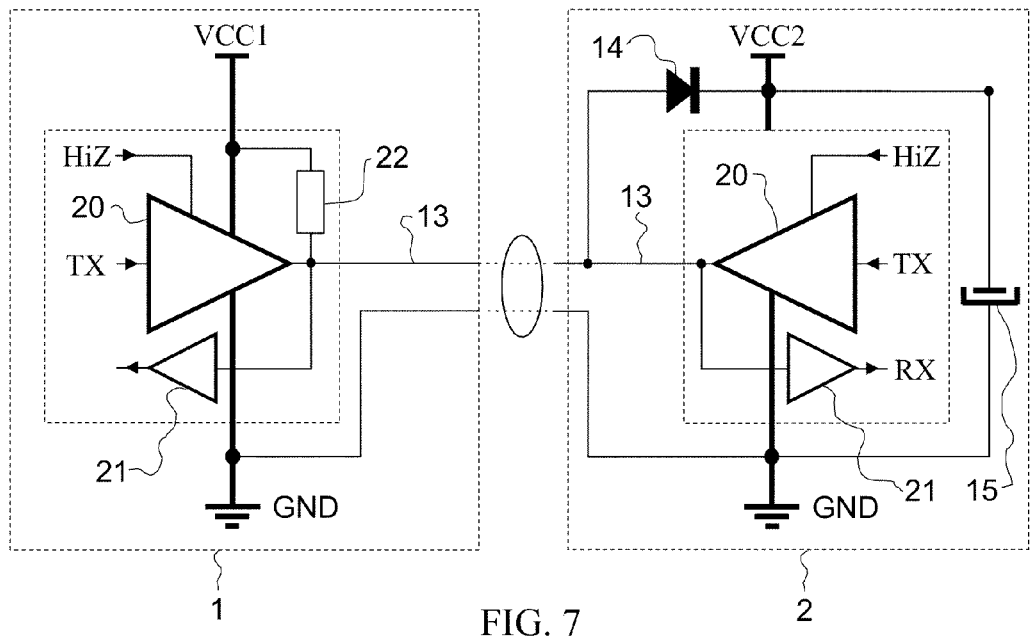
Figure 8:
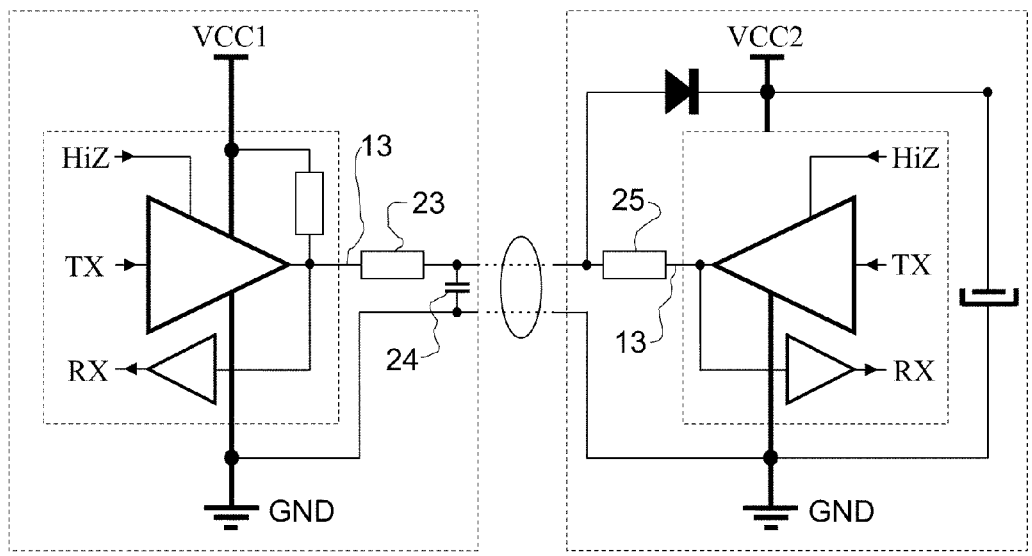
Figure 9:
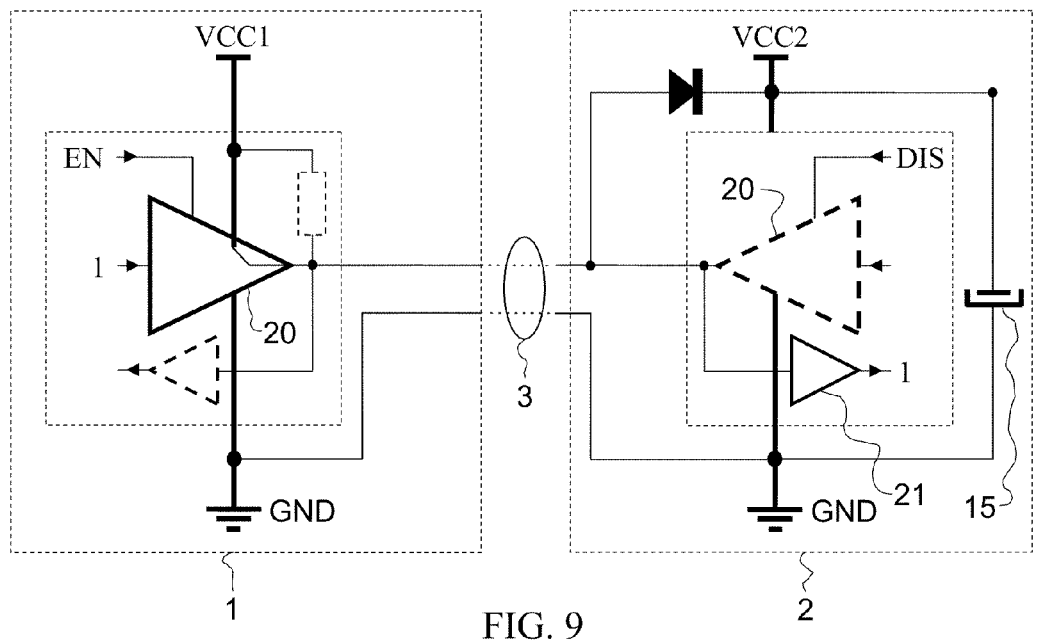
Figure 10:
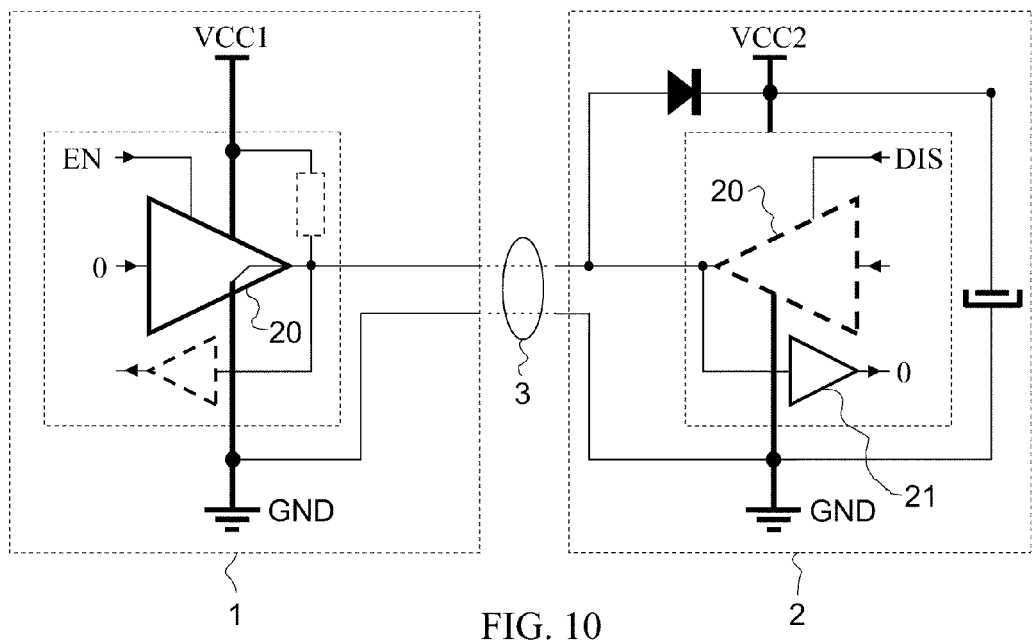
Figure 11:
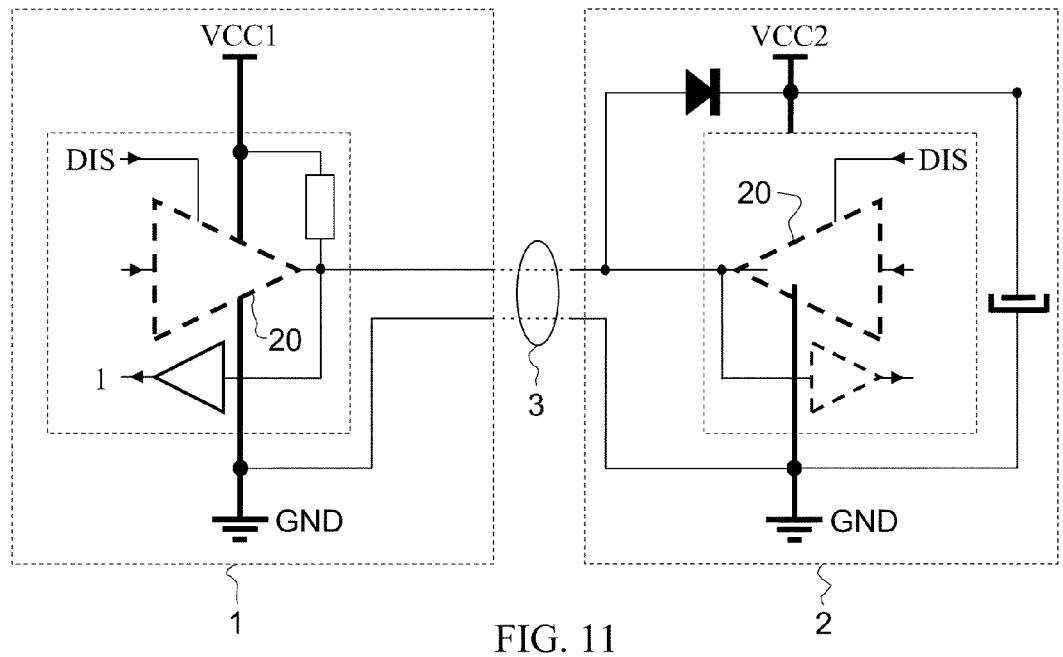
Figure 12:
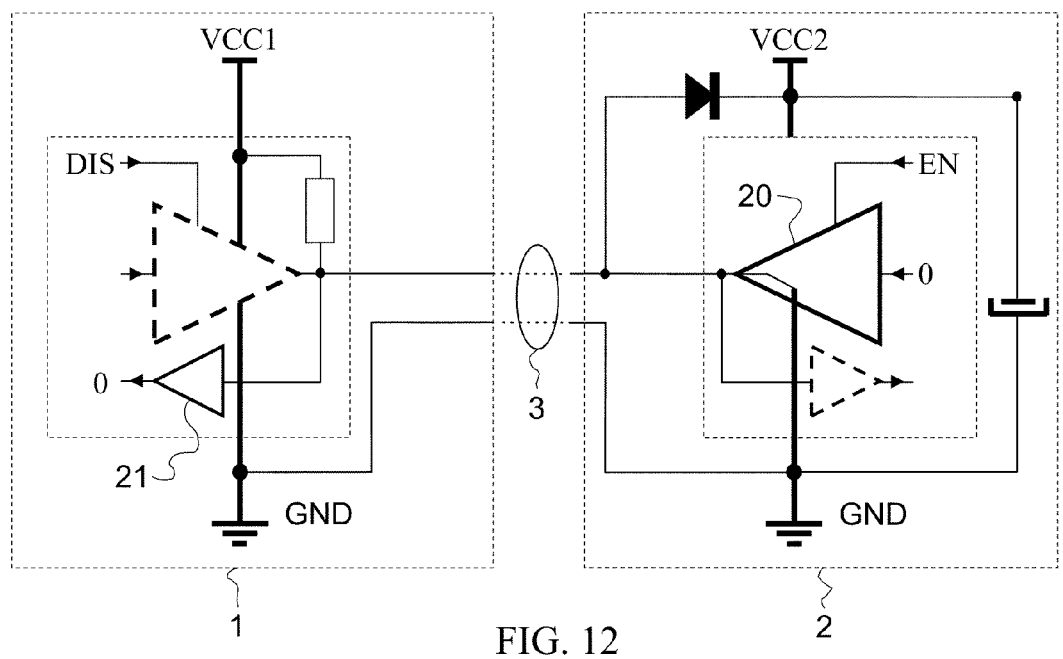
Figure 13:
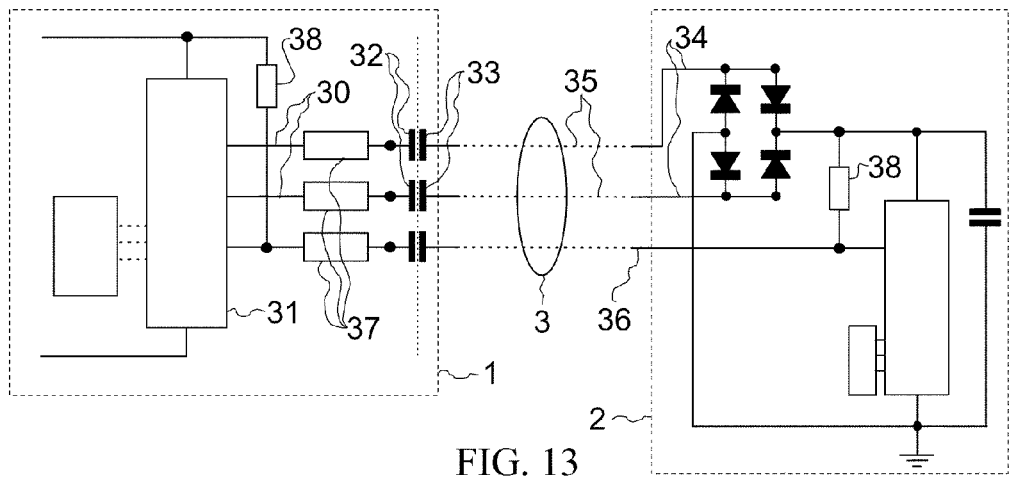
Figure 14:
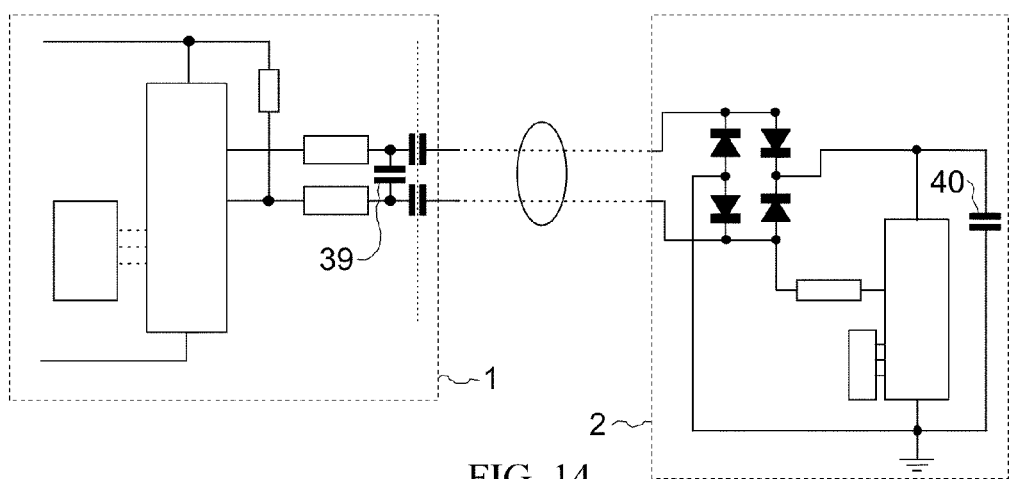
Figure 15:
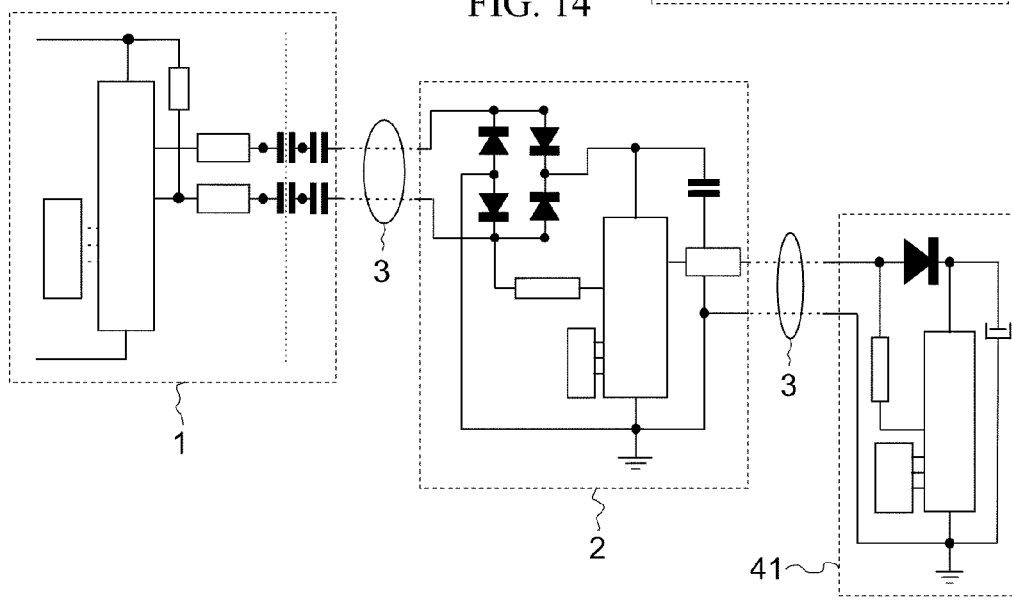
Figure 16:
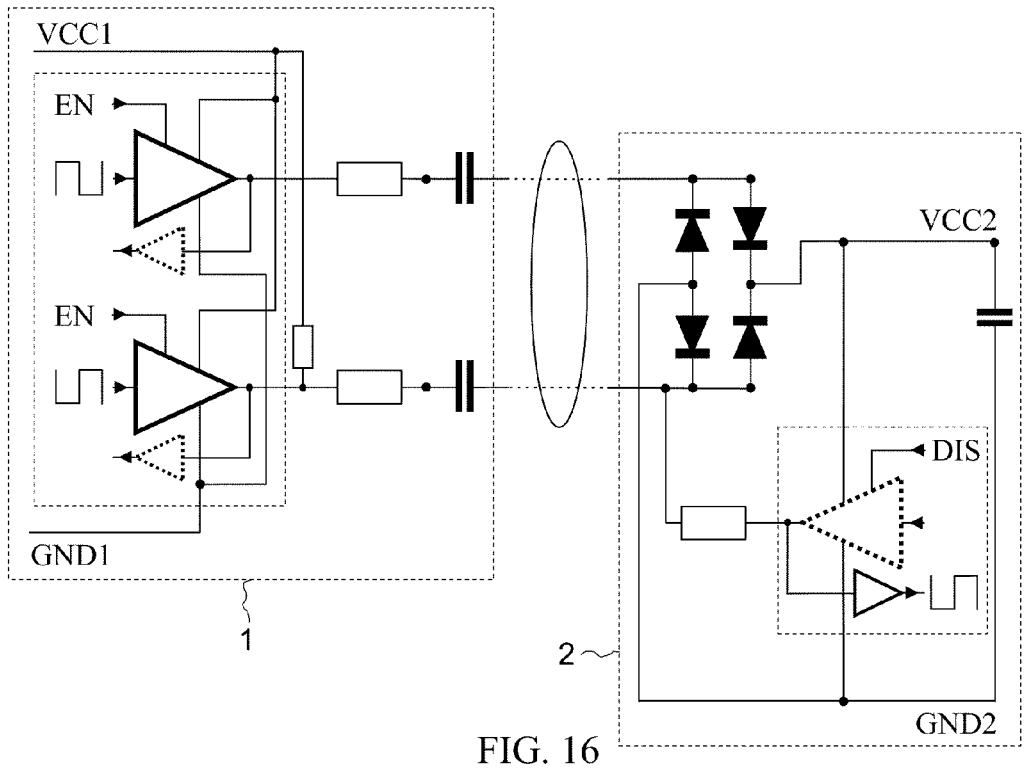
Figure 17:
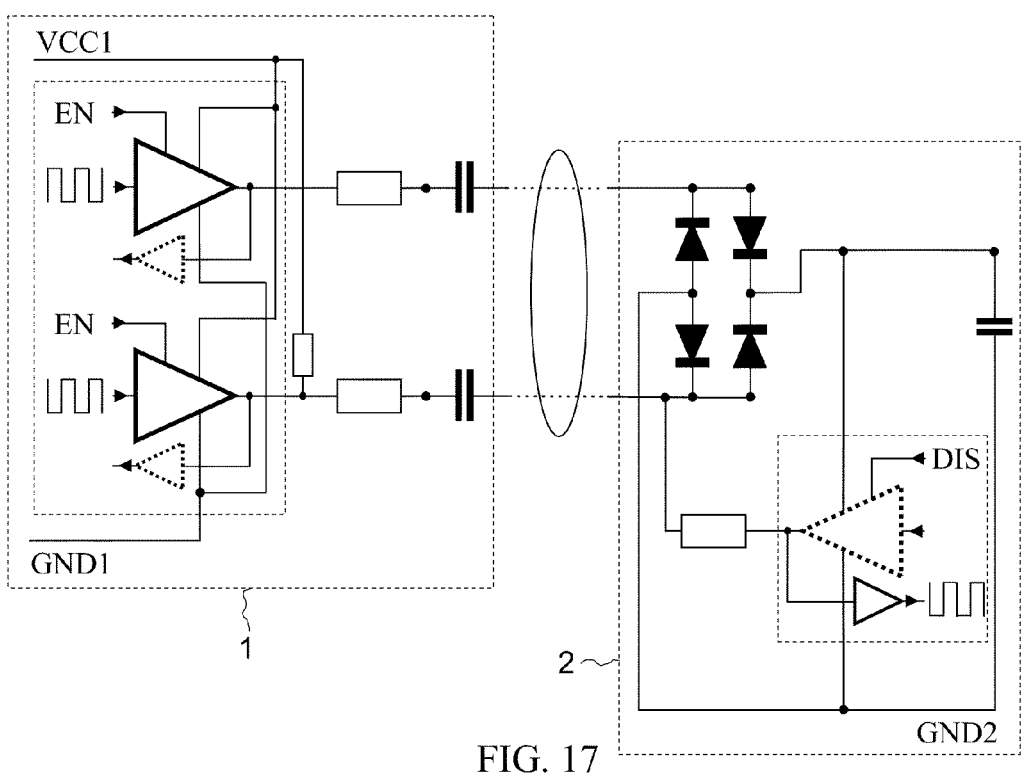
Figure 18:
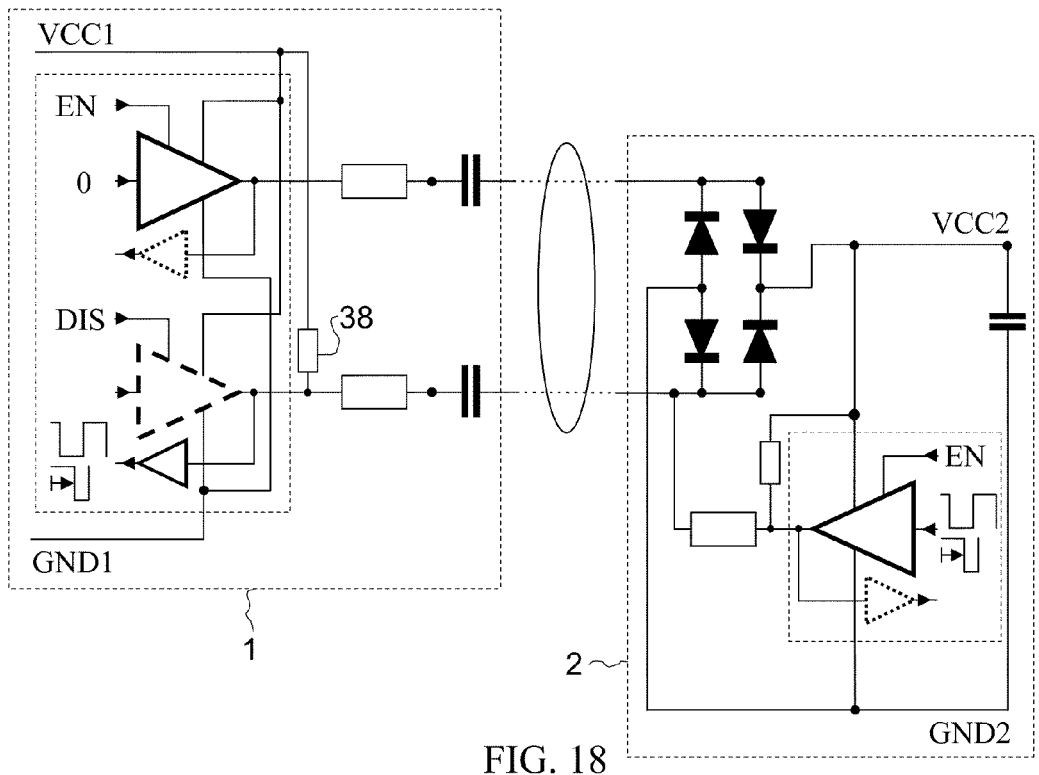
Figure 19:
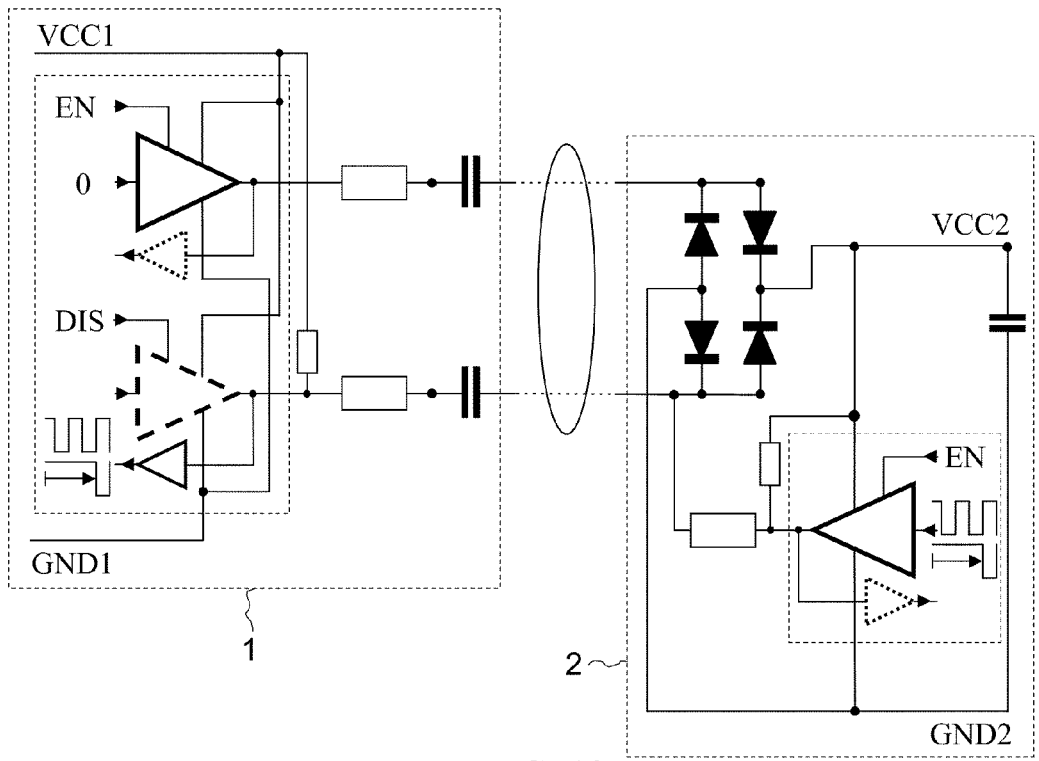

Other advantages and characteristics of the invention will become apparent upon examining the detailed description of not at all limiting embodiments, and the appended drawings wherein:

FIG. 1 illustrates a typical embodiment with two subassemblies;
FIG. 2 illustrates a case of a tree-structure embodiment;
FIG. 3 illustrates a first alternative with 3 conductors;
FIG. 4 illustrates a second alternative with 3 conductors;
FIG. 5 illustrates a typical application with 2 conductors;
FIG. 6 illustrates a case of a cascaded embodiment;
FIG. 7 illustrates a typical interface structure for 2 conductors;
FIG. 8 illustrates improvements of the interface for 2 conductors;
FIG. 9 illustrates the emission of a logic state 1 by the upstream interface;
FIG. 10 illustrates the emission of a logic state 0 by the upstream interface;
FIG. 11 illustrates the emission of a logic state 1 by the downstream interface;
FIG. 12 illustrates the emission of a logic state 0 by the downstream interface;
FIG. 13 illustrates an insulated embodiment with 3 conductors;
FIG. 14 illustrates an insulated embodiment with 2 conductors;
FIG. 15 illustrates a super-insulated embodiment with 2 conductors;
FIG. 16 illustrates the emission of a 0 state by the upstream insulated interface;
FIG. 17 illustrates the emission of a 1 state by the upstream insulated interface;
FIG. 18 illustrates the emission of 0 state by the downstream insulated interface;
FIG. 19 illustrates the emission of a 1 state by the downstream insulated interface;
FIG. 20 illustrates an interface with a voltage adapter;
FIG. 21 illustrates an insulated interface with a voltage adapter;
FIG. 22 illustrates a first standby cut-off device implementing the invention;
FIG. 23 illustrates a second standby cut-off device implementing the invention;
FIG. 24 illustrates a programming unit implementing the invention.

DETAILED DISCUSSION OF THE INVENTION

The invention relates to an electronic system comprising at least two subassemblies connected through an assembly of conductors, the invention more particularly comprises:

At least one subassembly comprising a microprocessor and so-called upstream interface means capable of supplying energy to at least one other subassembly and of receiving and/or transmitting information respectively from and/or towards at least one other subassembly to which it is connected; and At least one subassembly comprising a microprocessor and so-called downstream interface means capable of receiving energy provided by another subassembly and of emitting and/or receiving information respectively towards and/or from this other subassembly; and At least one assembly of conductors comprising at most three conductors for connecting the upstream and downstream interface means of two subassemblies, said assembly of conductors being capable of transferring energy from the upstream interface means towards the downstream interface means, said assembly of conductors being further capable of transmitting information between both subassemblies.

By main subassembly comprising at least one microprocessor and power supply means is meant an entity placed upstream from another one in a relationship of a subassembly providing energy to a subassembly receiving energy. The subassemblies in the sense of the invention are most often electronic entities confined in distinct casings but there is no departure from the scope of the invention in the case of subassemblies sharing all or part of a common case.

By assembly of conductors within the scope of the invention is meant any assembly of one to three conductors. The assembly of conductors in the sense of the invention may be an assembly of conductors grouped together in a common sheath forming a cable in the conventional sense. This may also be an assembly of conductors, the individual insulators of which are integral therewith as for example in the case of a ribbon cable. However there is no departure from the scope of the invention within the scope of an assembly of individual conductors at least partly mechanically free from each other. The assembly of conductors according to the invention may also for example be formed with printed conductors on a flexible insulating substrate. Finally, it is intended not to limit the notion of conductor to only the conduction of electricity, provision is made in the invention for alternative embodiments all or partly based on light conductors such as optical fibers or combinations of optical fibers and/or electric conductors.

Within the scope of implementing the invention using conductors of electricity, the transmission of information according to the invention, at least in one direction, is based on the modulation of a voltage. This modulation allows transmission of information in the form of at least two logic states which are associated with voltages, one of which is generally close to the reference voltage common to the subassemblies which is most often zero volts (ground). Provision is also made in certain alternatives of the invention for using two different non-zero voltages for communication purposes.

In an alternative preferring the reduction in the number of conductors comprised in said at least one assembly of conductors for connecting at least the main subassembly to said at least one secondary subassembly, it is provided that this number of conductors shall only be two. This may for example be a conductor setting to the same reference potential the electronics of two subassemblies connected through the assembly of conductors, the other conductor being used for transferring energy and for transmitting information. Also in certain alternative embodiments, these may be two conductors, the interface of which in at least one of the subassemblies is laid out so as to insulate the electronics of each subassembly. A solution comprising two optical fibers is also provided, one of which is allotted for transferring energy and uses a suitable wavelength, for example in the infrared, the other optical fiber being used for transmitting information.

The invention further provides that at least one subassembly is laid out so that said at least one assembly of conductors does not require any shielding for complying with mandatory normative criteria for implementation as regards electromagnetic compatibility in emission and/or in immunity. This technical characteristic is particularly useful within the scope of applications of the invention wherein the electronics is at the potential of the mains, observance of the safety standards imposing in this case the use of cables which comply with the safety standards in effect. Such cables do not currently exist in a shielded version. They would be of a cost, diameter and rigidity incompatible with consumer uses. It is intended to observe the emission levels for the relevant frequencies by for example selecting a relatively low frequency as regards the modulation allowing transmission of information between modules and by the use of suitable filtering which may in most cases only be a simple RC network comprising a resistor placed in series and a low value capacitor, the plates of which are at the potentials of two of the conductors.

In optoelectronic alternative embodiments, it is also provided that said at least one assembly of conductors only comprises one conductor, this conductor being capable of conducting light, at least in certain wavelengths, the light being used for transferring energy and for transmitting information. This for example is a cladded optical fiber, the propagation medium of which is glass or plastic material. Said fiber is capable of transferring energy from a light source with suitable wavelength and power, said light source being suitably coupled with the optical fiber in order to limit energy losses upon emission. The subassembly at the other end of the optical conductor comprises a means for converting received light energy into electricity in order to cover energy needs. These for example may be means suitable for sensing on a small surface utilizing the photovoltaic effect or means of the thermopile type, more effective in the infrared. In a single-fiber application of the invention, it is provided that the transmission of information between subassemblies shall be based on the modulation of at least one of the characteristics of the light ensuring energy transfer and/or that it makes use of light transmission at, at least one other wavelength, in the same propagation medium.

The system according to the invention as a whole forms an apparatus. It is provided that the invention shall preferably be intended for making apparatuses i.e. technical entities which may be defined by the provided functionalities. Said apparatuses are materialized by several subassemblies connected through non-disconnectable robust wiring means made mechanically interdependent of the casings of subassemblies via suitable means such as cable gland. The selection of non-disconnectable wiring means makes said subassemblies non-detachable which promotes electric safety and reduces application costs. This selection is particularly suitable in the case of household appliances the electronics of which is globally at the potential of the electric mains, this in order to give preference to electrical safety of persons. Alternatives are also provided in which the wiring connection means are disconnectable. This selection is particularly suitable within the scope of optional subassemblies for specializing and/or functionally enriching the appliance formed by a plurality of subassemblies.

It is further provided within the scope of the system according to the invention that at least one conductor of said at least one assembly of conductors is directly or indirectly connected to at least one input and/or output port in connection with said at least one microprocessor comprised in at least one subassembly. By indirectly connected is meant the connection of the conductor to at least one input/output port via at least one passive component such as a resistor or any assembly of passive components for example forming a filter. Within the scope of indirect connection, provision is also made for any adaptation means comprising semiconductors, in particular any voltage adaptation means. By input/output port is meant any pin of an integrated circuit which may be exploited via a programmatic route as an output exclusively, as an input exclusively, or as an output or input depending on the needs. Any specialized peripheral output comprised in said integrated circuit is also assimilated to an input/output port according to the invention. Such peripherals may for example be timer circuits which may be utilized as a frequency generator having at least one direct output on one pin of the component. This may also for example be a comparator, an interrupt generator, a pulse counter, the corresponding pins being able to be utilized at the input.

In applications of the invention using optical conductors, optoelectronic components are comprised between said at least one input/output port and the optical conductor.

In a preferred alternative of the system according to the invention, at least one subassembly supplies electric energy to at least one other subassembly to which it is connected, from electric energy exclusively provided by one or by several input and/or output ports of one or more components, this component or these components comprising or being in connection with at least one microprocessor. These particularly advantageous alternative embodiments of the invention make use of the high output and/or current absorption capabilities of the output stages of modern components such as microcontrollers or on-chip systems which alone or as a combination allow the powering of one or more complete electronic subassemblies. These alternatives also utilize the wide ranges of power supply voltages of modern components such as microcontrollers and/or the availability of versions with a lower supply voltage for equipping subassemblies powered by input/output ports of other components advantageously selected for their capability of providing higher voltages.

Provision is also made for the system to further comprise at least one electronic component in order to ensure galvanic insulation between at least two subassemblies so as to ensure safety of persons according to the standards in effect, although the whole of the connecting conductors between said at least two subassemblies do not provide, as such, technical characteristics capable of ensuring safety of persons according to said standards in effect.

In certain alternative embodiments of the invention, said at least one electronic component for ensuring galvanic insulation between at least two subassemblies is a transformer comprising at least one primary winding and one secondary winding.

In other alternative embodiments, said at least one electronic component for ensuring galvanic insulation between at least two subassemblies is an optoelectronic component.

In other alternative embodiments, said at least one electronic component for ensuring galvanic insulation between at least two subassemblies is a capacitor.

Advantageously, it is also provided that the system according to the invention comprise a plurality of electronic components mounted in series so that the safety of persons is still ensured in the case of a fault by a short circuit of at least one of said components mounted in series. In practice, two components mounted in series are generally sufficient. They are selected so that if either one is short-circuited, the function is still fulfilled and safety remains ensured.

According to another aspect, the invention deals with a method for use in a system according to the invention for allowing energy supply and information transmission through the same conductors, the method comprising:
   a step for energy transfer, and
   a step for intermediate storage and/or smoothing of the received energy in the powered subassembly so that transmission of information does not perturb the power supply of the circuits of the powered subassembly.

Generally, the step for storing and/or smoothing out the received energy is performed in one or more capacitors comprised in the powered subassembly.

It is provided that the method shall further comprise:
   a step for transmitting information from the powering subassembly to the powered subassembly, said information transmission step being at least partly capable of transferring energy from the emitter to the information receiver.

In the case of energy transmission by conduction of electricity, it is provided that the transmission of information shall be accomplished by modulation of a voltage. In certain alternative embodiments it is provided that the voltage shall be provided batchwise, the discontinuities being in connection with the transmission of information. In other alternatives, it is provided that the transmission of information shall be based on at least two voltage levels coding at least two logic states, the voltage for which the value is the smallest being nevertheless sufficient for ensuring the energy supply of said at least one powered subassembly. The modulation of the supply voltage between two non-zero values may for example be based on a linear regulator circuit, for which activation or not of an input/output port of the powering subassembly modifies the voltage reference. This may also be short-circuiting by an input/output port of a resistor causing a voltage drop in the non-short-circuited state. It is also provided that the change in the value of the supply voltage be based on the activation of a zener diode by an input/output port.

Further, means such as a diode are jointly used with the means for intermediate storage and/or smoothing out of the energy received in the powered subassembly in order to allow modulation of the supply voltage provided by the powering subassembly without affecting the supply voltage of the powered electronic subassembly. In the case of transmission of energy by conduction of light, it is provided that transmission of information shall be accomplished by modulation of the light power of the signal ensuring the energy transfer, by modulation of its wavelength or by the use of another signal having a different wavelength.

It is provided that the method shall further comprise:
   a step for transmitting information from the powered subassembly to the subassembly powering it.

In the case of transmission of energy by conduction of electricity, alternative embodiments are provided wherein the transmission of information is accomplished by modulation of a voltage. In certain alternatives, in particular those requiring bidirectional communication between the subassemblies, it is also provided that the communication in the direction from the powered subassembly to the powering subassembly shall use solutions based on either activation or not of an additional load such as a resistor by an input/output port in connection with the microprocessor of the powered subassembly. In the case of transmission of energy by conduction of light, it is provided that the transmission of information shall be based on the use of any type of modulation of a signal, the characteristics of which are compatible with the applied light conductor.

It is provided that the method shall further comprise:
- a step for detecting the operational presence of a powered subassembly, said step being performed in the subassembly which powers it.

It is provided in the invention that the powering subassembly shall be capable of detecting the operational presence of the powered subassembly.

By operational presence is meant a condition detectable by the powering subassembly which is associated, with high likelihood, with rated operation of the powered subassembly, notably with rated execution of the instructions of the microprocessor comprised in the powered subassembly. In particularly elaborate alternative embodiments of the invention, the powering subassembly is further capable of detecting a piece of information associated with at least certain characteristics of the powered subassembly. Provision is for example also made for detecting a piece of information further indicating to the powering subassembly, the type of powered subassembly or alternatives of the latter in order to adapt if necessary functional characteristics accordingly.

It is provided that the method shall further comprise:
- a step for managing the reset of the subassembly powered by the subassembly which powers it, said step being performed in the subassembly which powers it.

In certain particularly preferred alternative embodiments of the invention, it is provided that the powering subassembly not detecting the operational presence of the powered subassembly after a determined detection waiting time, shall stop the transfer of energy during a determined period, so that the powered subassembly(s) are reset. This is somewhat a so-called watchdog function which is current within microcontrollers, and which is applied at the system within the scope of the invention. This technical characteristic is advantageous when the system according to the invention comprises several subassemblies connected through electric conductors. Such a system, in particular when the conductors are not shielded, is likely to capture electromagnetic parasitics capable of blocking or causing exit of one or more microprocessors from the normal execution of their program. The immunity of the system according to the invention toward all types of accidental malfunctions is reinforced by the setting-up of <<local watchdogs>> at each processor according to the techniques of the state of the art which are advantageously completed by the setting-up of <<system watchdogs>> according to the invention between each pair of powering subassembly and powered subassembly.

The system and the method according to the invention are particularly suitable for making consumer electronic appliances connected to the electric mains and comprising a remote control. Said control may further comprise display means.

The system and the method according to the invention are particularly suitable for making appliances comprising one or more optional functional extensions. Indeed the small number of conductors required for connecting the subassemblies according to the invention makes it suitable for an application within the scope of functional extensions of appliances which are simple to install. Said functional extensions are materialized by the connection of at least one complementary subassembly comprising at least one microprocessor as described in the invention. As the number of conductors of the assembly of conductors according to the invention does not exceed three, many low cost connection solutions known to one skilled in the art may advantageously be used for connecting optional subassemblies. These may for example be so-called 3.5 mm mono or stereo <<jack>> connectors depending on whether 2 or 3 conductors are respectively used, these connectors being generally used in the field of audio and more particularly for connecting earphones. Other types of low cost consumer electronic connectors may also be used such as so-called <<modular jack>> connectors generally used in the field of telephony.

DETAILED DESCRIPTION OF FIGURES AND EMBODIMENTS

Other particularities and advantages of the invention will further become apparent in the description hereafter. In the appended drawings given as non-limiting examples:

FIG. 1 illustrates a typical embodiment with 2 subassemblies. This is the simplest architecture for implementing the invention. A first subassembly 1 comprising a microprocessor 8 and which is capable of supplying energy to another subassembly 2 also comprising a microprocessor 8 via an assembly of conductors 3. In this example, the capability of the first subassembly of powering another subassembly is related with the presence of a power supply 4 receiving energy from the electric mains through a suitable connection 5. It is provided that this power supply shall also receive the required energy by an embedded energy source internal or external to said first subassembly. These may for example be battery cells, a rechargeable battery if necessary completed by photovoltaic cells, an electrokinetic generator or using human force, etc. It is provided that not only said first subassembly shall be capable of powering another subassembly, but of course also, that it be also capable of meeting its own energy needs. The capability of powering another subassembly also relies on the characteristics of the so-called upstream 6 and downstream 7 interfaces combined with those of the assembly of conductors 3. The subassemblies further comprise local resources 10 such as for example, sensors, actuators or means for interacting with the user.

FIG. 2 illustrates a case of an embodiment with a tree structure. This is for example a more complex architecture than in the previous figure. A first subassembly 1 has the main power supply source 4. It is provided in the invention that certain subassemblies shall have their own local power supply means 9 capable of meeting at least partly their own energy needs and optionally the energy needs of other so-called downstream subassemblies which are either powered or not according to the invention. These may for example be photovoltaic cells, batteries, etc. These local power supply means are for example used for powering local resources of the subassembly, the main resources, among which the microprocessor, being powered according to the invention. It should be noted that the invention provides in each subassembly the possibility of the existence of local resources 10 which are in connection with the functional characteristics of said subassembly. It is provided that the functions revealed by means of said local resources shall entirely be of local origin for a given subassembly. It is also provided that local resources of a subassembly may provide functions in connection with the presence of one or several other subassemblies of the thereby built system. Said local resources according to the invention may for example be means for interacting with the user such as display means with optionally tactile input means and/or buttons, these may also be one or more sensors and/or actuators, programming elements capable of being executed by at least one microprocessor of the subassembly, etc.

Within the scope of an embodiment of the invention having a tree structure as in the example of FIG. 2, the application of 3-wire alternatives is particularly preferred for intermediate subassemblies through which transits the energy required for powering a plurality of subassemblies in a chain. The 3-wire solutions are, all things being moreover equal, capable of easily transmitting more current. The alternatives with two conductors are particularly well suited for connecting the final subassemblies. Nevertheless provision is made for being able to process a tree structure as a whole by exclusively applying alternatives with two conductors or alternatives with three conductors or further by applying alternatives with two conductors for the intermediate subassemblies and alternatives with three conductors for the end subassemblies.

FIG. 3 illustrates a first alternative with 3 conductors. The electronic subassembly 1 comprising a microprocessor 8, is capable of powering at least partly at least one other electronic subassembly 2 comprising a microprocessor 8 and of transmitting information, at least in one direction, via an assembly of conductors 3 comprising at most three conductors. In this exemplary embodiment, the power supply source comprised in the subassembly 1 powers the subassembly 2 via two conductors comprised in said assembly of conductors according to the invention. Transmission of information between both subassemblies uses the third conductor with reference to the potential of both and/or either one of the conductors. It should be noted that the invention provides that transmission of information shall be unidirectional in the direction from the downstream subassembly to the upstream subassembly or from the upstream subassembly to the downstream subassembly. Bidirectional transmission of information is of course provided in that it increases the functional richness of the system. The invention provides any type of digital coding but also the possibility of transmitting information according to coding which is at least partly analog. For example, said information is associated with more than two distinct values of the voltage of the third conductor relatively to a reference which is the potential of one of the other conductors. This alternative has the advantage of being able to easily transfer a greater intensity and/or a higher voltage than the one applied in the interface component. Of course, in the case when the power supply voltage transmitted by the assembly of conductors is in excess, means, not shown in the figure, have to be added in order to lower the power supply voltages of the components down to suitable values. The non-limiting example of the figure illustrates in each subassembly (1, 2), a main component which is a microcontroller itself comprising a microprocessor 8 and to which are connected means 11 which illustrate local hardware resources. Of course, there is no departure from the scope of the invention if the microprocessor is not integrated into a microcontroller or if on the contrary it is integrated into an even more complex component such as a <<System On a Chip>>. There is neither any departure from the scope of the invention in the absence of local hardware resources in one or more subassemblies. The figure shows components 12 within the scope of the interface of the conductors. This is a non-limiting example which has the purpose of protecting the input/output ports of the microcontrollers against consequences of any malfunction by participating in the reduction of the electromagnetic emissions to levels allowing compliance with the standards in effect. All or part of the additional components may be removed, replaced with components of another type, or completed without departing from the scope of the invention since they do not directly affect the main characteristics of the invention, but improve the application thereof in a statutory context in connection with the industrialization of the systems according to the invention. Also, the transmission of information between subassemblies may, according to applied solutions, require one or more additional components such as pull-up resistors for reaching the logic state one or pull-down resistors for reaching the logic state zero, these optional resistors may be integrated into components such as a microcontroller or input/output peripherals within the scope of programmable resources allotted to each input/output port. For example the microcontrollers of the AVR family from Atmel (registered trade marks), integrate within the scope of each standard input/output port, the equivalent of a pull-up resistor for obtaining the logic state 1, with a value comprised between 20 and 50 kilo-ohms. This resistor may be connected or disconnected depending on the instructions of the program executed in the microprocessor.

FIG. 4 illustrates a second alternative with 3 conductors. The alternative illustrated by FIG. 4 differs from that of FIG. 3 by the fact that the second subassembly is powered by the voltage and current exclusively provided by an input/output port 13 of a component comprising a microprocessor or in connection therewith. Several input/output ports may be combined in order to provide the required current. The combination of the powers advantageously occurs via a balance resistor, resistors which further play a role in protecting the output stage of the component against excess intensities upon power-on which may result from the presence of a high value capacitor in the circuit of the powered subassembly. It is neither customary nor orthodox to use input/output ports of components as a source for powering one or more electronic subassemblies. This being so, the electric characteristics of most modern microcontrollers are of high interest for implementing the invention since the output stage comprised in the commonplace input/output ports gives the possibility of producing or absorbing up to about twenty milliamperes. By combining several input/output ports it is possible to reach a constant overall intensity of more than 150 milliamperes from a single standard component. Moreover, as regards voltages, modern microcontrollers generally provide an extended range of power supply voltages, at least for certain versions in most market families, for example from 1.8V to 5.5V. Further, the technology used for making the transistors of the output stages comprised in what should be called a commonplace input/output port, allows the potential of the relevant pins to be set to voltages close to the power supply voltages, for example of the order of 0.8V for the logic state zero. For the logic state one, the voltage provided by each input/output port is guaranteed to be greater than 4.0V at a power supply voltage of 5V and greater than 2.3V for a power supply voltage of 3.0V.

The figures given as an order of magnitude are extracted from the specifications of microcontrollers of the AVR family of Atmel (registered trade marks) but the same applies for the most recent microcontrollers on the market. Thus, technically, a first microcontroller may perfectly power, through one or through several of its optionally combined input/output ports, one or more other microcontrollers and optionally all or part of their local resources. Of course the illustrations are only given as an example from other possible options for implementing the invention. Thus, without departing from the scope of the invention, it is perfectly possible to reverse the conventions on the preference generally given to zero volts of the power supply in order to make it the common reference for several electronic subassemblies. The invention may perfectly be applied by using one of the conductors for sharing the power supply voltage which thus becomes the reference common to the subassemblies, another conductor ensuring return of the current into the power supply by means of one or several input/output ports programmed at the output to be in the logic state zero. This selection may be advantageous in that the output stages are generally more effective by providing a lower voltage drop when they are active in the zero logic state.

The fact of powering one or several electronic subassemblies through at least one input/output port, further provides the advantage of allowing the upstream processor to control the resetting of the downstream processor(s) within the scope of a programmed sequence in the case of a reported malfunction or of a simple preventive step for example periodically executed for preventing possible definitive derailments of processors, derailments which cannot always be rescued by optional local protection devices which are based on a time-out to be reset before its expiry so as to avoid a reset of the microprocessor (watchdog). Such derailments may be observed for example as a result of high energy parasitics captured or propagated by the conductors.

FIG. 5 illustrates a typical application with 2 conductors. This alternative embodiment of the invention uses one of the two conductors for sharing a voltage reference common among the subassemblies, the other conductor being used for transferring energy or information. In the example of FIG. 5, <<zero volts>> of the power supply of the electronics is retained as the common reference among the electronics of said subassemblies while being aware that there is no departure from this scope of the invention upon selecting another application option based on the selection of the positive voltage of the power supply as a common reference. Of course, inverting the polarity of the reference voltage involves adaptations relatively to the option of FIG. 5 on the connection of elements such as pull-up resistors, the orientation of the polarity of certain components, etc.

This alternative of the invention requires in the powered electronic subassembly, temporary storage means 15 and a diode 14 preventing upstream discharge of the storage means. This is so in order to be able to interrupt the signal from the first subassembly during short times with the purpose of transmitting information without perturbing the powering of the circuits including the microprocessor of the second subset. The signal from the first subassembly is mainly dedicated to powering the second subassembly, the interruptions of the state of the signal associated with the power supply of the second subassembly being arranged so as to be of short duration and not to generate a duty cycle which may lead to interruption of the power supply of the second subassembly. The decentralized architecture in tandem with the invention is advantageous in that each subassembly comprising a microprocessor is capable of locally processing the raw and rich information for example relating to the sensors, a programmable time-keeping instrument, etc., so as to not have to transmit in fine one or a few bits of a prepared state which may for example represent the state of an output within the scope of temperature control or of an external load control by means of a relay. In order to give preference to the state which contributes energy for powering the downstream subassembly, not only the reduction in the amount of information to be transmitted will be sought but a coding such as a Manchester code will advantageously be applied in order to exclude the risk of an interrupt during a too long period which would exceed the temporary storage capacities of the downstream subassembly and therefore would lead to a shutdown. It is provided that the coding of the information in the most unfavorable case taking into account tolerances as well as ageing of critical components, such as for example the temporary storage capacitor, shall be arranged so as not to lead to a shutdown. It should be noted that energy may also be stored in inductors with a magnetic core and that this type of component may also be applied within the scope of the invention. However, there is no departure from the scope of the invention if the second subassembly is only powered periodically and during a short duration, for example in the case of a system powered by embedded means such as battery cells, photovoltaic cells and/or batteries. Neither is there any departure from the scope of the invention when the positive power supply voltage (VCC1=VCC2) is taken as a common reference, while separating the respective <<zero volts>> of each subassembly (GND1 and GND2), while placing the diode between the input/output port and GND2 after having reversed the bias. The management of the input/output port also has to be subject to an inversion of the logic states in order to obtain an operation equivalent to the common <<zero volts>> application option illustrated in the figures. As in the case of embodiments of the invention with three conductors, the embodiments with two conductors may benefit from the combination of the contributions of several input/output pins. In certain alternatives, the question is of combining input/output pins in order to increase the output current. In other alternatives, the question is of permanently combining specialized pins at the input or at the output. In other further alternatives, provision is made for combining a plurality of input/output pins via resistors having different values and the combination being carried out sequentially over time in order to make the rise times and/or fall times of the signals gradual at least stepwise in order to reduce the radiated perturbations.

FIG. 6 illustrates a case of a cascaded application of subassemblies according to the invention in their alternative with two conductors. Of course, the application of alternatives with 3 conductors or with 1 conductor within the scope of a cascaded set-up, which may moreover comprise more than two stages, is provided in the invention. This example further illustrates the possibility of combining several input/output ports 13. It should be noted that the cascading of subassemblies with two conductors leads to a reduction in the power supply voltage at each stage which limits the maximum possible number of them. In an application as illustrated in FIG. 6, the voltage VCC1 is greater than VCC2 which is greater than VCC3, etc. This being so, by resorting to microcontrollers with a low power supply voltage, or even to voltage boosting circuits in certain subassemblies, it is possible to create cascades comprising many stages without departing from the scope of the invention.

FIG. 7 illustrates a typical interface structure for 2 conductors. This example illustrates the use of typical internal resources of input/output ports of modern microcontrollers in order to apply the invention by resorting to not very many external components.

The internal structure of a digital input/output port of a modern microcontroller generally comprises an output stage 20 capable of delivering or absorbing significant current through the corresponding port 13 of the component. The output stage may also be placed with high impedance notably in order to configure the shared pin at the logic input. To this common input/output pin is also connected internally an input stage 21 capable of reading the logic state of the pin. Internal means 22 acting as a pull-up resistance for obtaining a determined logic state, generally logic state 1, are generally added so as to have a known state at the input when the input/output pin is disconnected externally. With this, keyboards without any additional components may notably be interfaced. The pull-up/down resistor function integrated in modern microcontrollers is equivalent to the presence of a pull-up resistor to the power supply voltage which is connectable by programming route to the input/output pin. The value of the equivalent resistance is generally comprised between 20 and 50 kilo-ohms, with which the voltage levels may be suitably set on the relevant pins without excessive consumption of current. The whole of the internal resources listed earlier are configurable by programming route. The example of FIG. 7 aiming at implementing the invention by minimizing the external components, taking into account the presence of an integrated pull-up resistor for state 1, leads to selecting the <<zero volt>> power supply potential (ground, and marked as GND in the figures) as a common reference voltage among the modules. Although the internal structures of the microcontrollers comprised in the subassemblies 1 and 2 are a priori identical, it was chosen for the clarity of the discussion and for making the differences with the state of the art more conspicuous to only illustrate in each subassembly the internal resources likely to be used within the scope of the invention. Thus, in subassembly 2, the pull-up resistor for state 1 and the power supply of the output stage capable of delivering a current flowing towards the external load have not been illustrated. Of course, other application choices such as an inversion of the polarities or further the use of external pull-up/down resistors may be made without departing from the scope of the invention. In this type of application, the power supply voltages decrease at each stage of a cascade at the very least by the potential difference on the terminals of the diode 14, to which is added the potential difference between the power supply voltage VCC2 and the output voltage in the 1 state of an input/output pin. In practice, the use of a Schottky diode will be preferred for their low voltage drop and for their capability of operating at high frequencies. This being so, so-called signal silicon diodes although having a slightly greater voltage drop, provide the advantage of greater robustness and of lower cost than Schottky diodes. The technology of the capacitor 15 will preferably be selected depending on the frequency of the signals used for transmitting information, this capacitor may also be an assembly of capacitors with different technologies such as multilayer ceramic and electrochemical capacitors. The values will advantageously be calculated depending on the average current to be provided to the subassembly 2 and the maximum duration of the required power supply interrupts for transmitting information.

FIG. 8 illustrates improvements of the interface for 2 conductors.

The external components 23, 24 and 25 are advantageously added to the basic solution illustrated by FIG. 7. These additional components materialize filters capable of lowering the level of radiated electromagnetic perturbations in order to comply with the statutory constraints such as the standards imposed within the scope of CE approval in Europe and FCC in the United States. The resistors 23, 25 further protect the output stages of the microcontrollers comprised in the subassemblies against possible destructive consequences of a short-circuit between the conductors and/or a programming derailment leading by error at least one of the processors to placing its relevant input/output port 13 as output in a logic state opposite to the one of port 13 of the other microcontroller also programmed as output. The previous comments relate to FIGS. 7-12.

FIG. 9 illustrates the emission of a logic state 1 by the upstream interface, this within the scope of the discussion of the step-by-step application of an alternative with two connectors of the invention as illustrated by FIGS. 9-12. The state illustrated by FIG. 9 is the preferred state in the application of the invention for this alternative. Indeed, this state is the one when the subassembly 1 transfers energy to the subassembly 2 by establishing a circuit for the flow of a current from the power supply VCC1 of the subassembly 1 to the loads of the subassembly 2, the loads of the subassembly 2 comprising the capacitor 15 which is charged during this phase. This state is further the quiescent state as regards transmission of information in the direction from subassembly 1 to subassembly 2. The output stage of the subassembly 1 imposes a logic state 1 on the corresponding pin. The output stage 20 of the subassembly 2 is set to high impedance in order to allow the reading of the state of the corresponding pin which materializes the relevant input/output port. The state of the relevant pin of the subassembly 1 is transmitted via both conductors 3 to the input stage 21 of the subassembly 2 which reads a logic state 1 in this example.

FIG. 10 illustrates the emission of a logic state 0 by the upstream interface. This is the active state as regards transmission of information in the direction from subassembly 1 to subassembly 2. The output stage 20 of the subassembly 1 imposes a logic state 0 on the corresponding pin. The output stage 20 of the subassembly 2 is set to high impedance in order to allow reading of the state of the corresponding pin which materializes the relevant input/output port. The state of the relevant pin of the subassembly 1 is transmitted via both conductors 3 to the input stage 21 of the subassembly 2 which reads a logic state 0 in the example. This state cannot be maintained past a determined time and cannot reappear beyond a determined frequency under the penalty of creating a break-down of the power supply of the subassembly 2. Thus, it will be particularly preferred to code the information on the basis of transitions rather than on states maintained for a certain time. The application of a code such as a Manchester code will advantageously contribute to reducing the risk of too long periods of interruption of the power supply.

FIG. 11 illustrates the emission of a logic state 1 by the downstream interface.

Reception by the subassembly 1 of information emitted by the subassembly 2 requires the removal of its output stage by switching to high impedance so that the input stage 21 is able to read the state of the corresponding pin which is imposed by the subassembly 2 via the conductors 3. Taking into account the presence in the subassembly 1 of a pull-up resistor for the 1 state, the active state for the subassembly 2 is the 0 state. Therefore, the emission of a 1 state by the subassembly 2 consists of setting its output stage 20 to high impedance, this further being a way of transmitting information in a particularly energy-sparing way.

FIG. 12 illustrates the emission of a logic state 0 by the downstream interface.

As in the case illustrated by the previous figure, the output stage of the subassembly 1 is set to high impedance. The emission of a 0 state by the subassembly 2 consists of setting its output stage 20 to the 0 logic state which is imposed to the input stage 21 of the subassembly 1 taking into account the high value of the pull-up resistor for the 1 state of the relevant pin.

FIG. 13 illustrates an insulated embodiment with 3 conductors. This alternative embodiment of the invention aims at separating in an electronic system, an electrically dangerous portion which is for example at the potential of the electric mains, and a portion which does not have any risk of electrocution. Many consumer electronic appliances, in particular those provided with remote hard-wired controls are confronted with this problem to which the only secure solution of the state of the art is to use approved cables for a use on the electric mains. The cables in question are necessarily of a relatively large diameter and have a section of the individual conductors greater than or equal to 0.5 $mm^2$. Normative requirements as regards electrical safety impose their use even if the required insulation voltage between conductors and the relevant currents are low. With so-called insulated alternatives of the invention it is possible to do without the cable constraints and provide the same electrical safety by using cables intended for low voltages such as for example the cables used in telephony or in computer equipment. In this alternative embodiment with three conductors, two conductors 35 are assigned to transmission of energy and the third 36 relatively to either one or both of the others, is assigned to transmission of information. Specialization of the conductors improves the effectiveness of the solution as regards transfer of energy and transmission of information. The subassembly 1 transfers energy to the subassembly 2 by delivering two signals in opposite phase, for example square-wave signals, for which the excursion swing is comprised between 0 and 5V, from two pins 30 of a component 31. These may be pins driven by internal means of the generic input/output port type used at the output and switched between the 0 and 1 states by programming route at a frequency comprised for example between 5 kHz and 500 kHz depending on the value of the applied capacitors 32. It is also provided that the pins shall be driven by a frequency generator or further by a configured timer as a frequency generator integrated into a microcontroller. When the generation means do not intend to provide two outputs in opposite phase, it is easy to add one or more external inverters for producing the two required signals in opposite phase. It should be noted that the application of the invention is tolerant towards wide changes in the frequency of the signals. Each of the two signals in opposite phase is applied to the plate of a capacitor 32, the other plate 33 of each capacitor being connected to the end of one conductor. The capacitors, for example capacitors of 10 nF of category Y2, ensure the sought galvanic insulation in order to notably ensure safety of persons in the case of contact with one of said conductors of the assembly 3 or with the electronics of the subassembly 2. Both conductors which are connected to the capacitors in the subassembly 1 have their other ends connected to the AC inputs 34 of a diode bridge within the subassembly 2. The DC outputs of the diode bridge, filtered by a suitable capacitor conventionally ensure the power supply of the subassembly 2. In order to reduce the voltage drops and to improve the high frequency yield if necessary, the diode bridge will advantageously be made from Schottky diodes.

The optional resistors 37 mounted in series with the capacitors aim at protecting the input/output ports of the component, notably against excessive currents, as well as reducing the levels of high frequency radioelectric emission. Pull-up resistors 38 towards one of the power supply voltages, towards the positive power supply voltage in the example of FIG. 13 allows logic levels to be set by default on the inputs. These non-critical resistors, the optimum value of which depends on that of the applied connecting capacitors, on the voltages and time characteristics of the signals to be transmitted, have values which for example are comprised between a few kilo-ohms and several hundred kilo-ohms. It is provided that all or part of the means which may be assimilated to these pull-up resistors may be comprised in integrated circuits such as microcontrollers or be external passive components. Of course, there is no departure from the scope of the invention by using means functionally equivalent to those described within the scope of FIGS. 7-12 and 16-19 but which would not be integrated or only partly within a same component. The examples of FIGS. 13-19 apply capacitors as electronic components ensuring galvanic insulation between the subassemblies, there is no departure from the scope of the invention by using inductive components such as transformers, the magnetic circuit of which is capable of operating at high frequency or further by using optoelectronic components.

FIG. 14 illustrates an insulated embodiment with 2 conductors.

This exemplary embodiment of the invention with galvanic insulation between the subassemblies differs from that of FIG. 13 in that only two conductors are used both for transferring energy from the subassembly 1 to the subassembly 2 and for transmitting information between the subassemblies. Sharing the connecting means between the subassemblies imposes constraints as in the alternative non-insulated embodiments with two conductors as described earlier. The communication in the subassembly 2 to subassembly 1 direction requires periodic interruption of the signals normally imposed to at least one of the two conductors by the subassembly 1 within the scope of energy transfer. It is provided that for example following an event on the initiative of subassembly 1, subassembly 2 shall transmit information in the form of at least one pulse or alternating signals capable of crossing the components ensuring galvanic insulation between the subassemblies. It is provided that during the transmission of information when the subassembly 2 is the emitter, the subassembly 1 shall maintain the unused input/output port at low impedance for the actual transmission at one of the power supply potentials by programming the output pin in order to obtain the suitable logic state. Thus, the charges may be transferred with good efficiency between the plates of the capacitors although said at least one pulse or the alternating signal is injected into one of the AC inputs of the rectifier bridge relatively to the DC voltages of the rectifier bridge which power the component ensuring generation of signals at low impedance. It should be noted that in the exemplary embodiment of FIG. 14, the injection of the signals emitted by the subassembly 2 is preferentially accomplished at the AC input of the rectifier bridge connected to the conductor which is associated with the input used for receiving the signals in the subassembly 1. This being so, provision is also made for injecting the signal into the input of the rectifier bridge which is in connection with the conductor which is not in direct connection with the receiving input in the subassembly 1. A capacitor 39, with a low value, as compared with that of the connecting capacitors, and without any particular requirement as to the insulating voltage and/or the safety class, may advantageously be added between both branches, in front of, as illustrated in FIG. 14, or behind both connecting capacitors comprised in the subassembly 1. The capacitor 39 substantially reduces the level of radiated perturbations, when the signals conveyed by the conductors are rectangular wave signals. It is provided that the transmission of information in the direction from subassembly 1 to subassembly 2, as in the case of non-insulated applications, shall rely on on/off modulation of the signal intended for transferring energy to the subassembly 2. However, frequency or phase modulation of the signal is preferred, ensuring energy transfer so that the energy transfer is not interrupted during the transmission of information in this direction, which increases the average amount of energy transferred to the subassembly 2 and allows a decrease in the capacities of temporary storage 40 in the subassembly 2. It is provided that the event initiated by the subassembly 1 in order to be detected by the sub-system 2 so as to report that the latter may emit under the provided conditions, shall be an interruption of the signal for a determined time. However, for the same reasons as explained earlier, the selection of a condition relating to the frequency or to the phase of the signal emitted by the subassembly 1 is preferred.

FIG. 15 illustrates a super-insulated embodiment with 2 conductors.

This example illustrates the reinforcement of electrical safety according to the invention by putting components in series, each of which is capable of ensuring insulation with the required safety, so that if a component is faulty by being short-circuited, safety is still ensured. This figure further illustrates the cascading of three subassemblies according to the invention. As galvanic insulation is ensured upon exiting the subassembly 1, the assemblies of conductors 3 between the subassemblies 1 and 2 and between the subassemblies 2 and 41 may be at a low insulation voltage even if the electronics of the subassembly 1 is at the potential of the electric mains.

FIG. 16 illustrates the emission of a 0 state by the upstream insulated interface. This example illustrates the application of the invention from standard resources which are available in most modern microcontrollers. These are generic input/output ports, those of the subassembly 1 being used at the output in order to produce on the corresponding pins two signals in opposite phase. An input in connection with the microprocessor of the subassembly 2, in this example an input/output port, where the output stage is set to high impedance by programming route, picks up the signal generated in the subassembly 1 on an AC input of the rectifier bridge. In this example, the transmission of a logic 0 is associated with low frequency.

Of course, there is no departure from the scope of the invention by inverting the association of frequency and transmitted logic state or by using any other correspondence rule which continuously maintains generation of the signals in opposite phase for transmitting energy. Provision is also made for transmitting two signals which are not simply in opposite phase but one of which may comprise several alternations during one alternation of the other signal. These alternatives provide the advantage of independence with regards to the cabling of said conductors which may be reversed without any incidence on the operation. Other alternative embodiments of the invention are provided, the proper operation of which requires observance of a given cabling of the conductors. For example, provision may be made for dedicating an input port to each of the two AC inputs of the rectifier bridge and for emitting on the side of the subassembly 1 a differentiated signal beyond simple phase opposition on either one of the outputs for transmitting a logic state 0 or 1.

FIG. 17 illustrates the emission of a state 1 by the upstream insulated interface. This example, which repeats in every point the characteristics of that of FIG. 16, illustrates the transmission of a logic state 1 by the subassembly 1 in the form of a signal having a higher frequency than that which is associated with logic 0.

FIG. 18 illustrates the emission of a 0 state by the downstream insulated interface.

This example illustrates the emission of a signal by the subassembly 2 towards the subassembly 1. A pin of a component of the subassembly 2 configured at the output injects at least one pulse or an alternating signal onto an AC input of the rectifier bridge relatively to the power supply rails of said component. It is provided that any type of information coding may be used. Manchester type encoding is also advantageous in the direction of information emission by the subassembly 2 to the subassembly 1. Interlacing of very short transmission periods from the subassembly 2 towards the subassembly 1 and of longer emission periods by the subassembly 1, acting as a power supply for the subassembly 2 is particularly preferred for limiting the need of temporary energy storage. Within a frame for example delimited by a longer period of emission by the subassembly 1 acting as a power supply or further by a particular piece of information which may be recognized by the subassembly 2, the interlaced pieces of information emitted by the subassembly 2 advantageously occur bit by bit. This is particularly suitable when the information to be transmitted is elaborated state information from local preprocessing which limits the need in amount of information to be transmitted. The information to be transmitted by the subassembly 2 may be coded by frequency or phase modulation with two states. The information may also be coded by variable time before emission of the signal from the synchronization imposed by subassembly 1. In the example of the figure, the coding of a logic state 0 is proposed by emission of a low frequency or by emission of a signal after a short time following the synchronization event. Provision is also made within the scope of an emission mode interlaced at bit level for not sending any signal for coding the logic state 0. In order to increase the amplitude of the signal received by the relevant input of the subassembly 1, the other pin is set as an output in order to create a return path for the currents through the power supply. Taking into account the decoupling capacitor necessarily present between the power supply rails of the component, in practice, the logic state statically imposed on the output of said other pin is of little importance. The pull-up resistor for obtaining a determined logic state statically, state 1 in the example, but which may also be the 0 state in practice, generally has a greater value than the value of the pull-up resistors integrated in the active components, for example a few hundred kilo-ohms. This is why this resistor was placed outside the component in the example, but there is no departure from the scope of the invention when using an integrated pull-up resistor.

FIG. 19 illustrates the emission of a 1 state by the downstream insulated interface. This example which repeats in every point the characteristics of that of FIG. 18, illustrates the transmission of a logic state 1 by the subassembly 2. The example shows the choices of coding the logic state 1 by a high frequency or by emitting a signal after a long period of time following the synchronization event. Provision is also made within the scope of an emission mode interlaced at a bit level, for sending a signal for coding the logic state 1.

FIG. 20 illustrates an interface with a voltage adapter. Provision is made in the invention for inserting between at least one of the conductors of an assembly of conductors 3 and means such as those of microcontroller 42, one or more voltage adapters 43 depending on the number and on the type of input/output ports (13, 44) used or further depending on the alternative embodiments of the invention. Indeed, increasingly developed miniaturization of highly integrated components such as microprocessors and microcontrollers, is accompanied by decrease in the operating voltages. Thus, at the date when the present description was written, the majority of microcontrollers were available in power supply ranges of the order of 2.7V to 5.5V but an increasing number of new components have appeared with a power supply range of the order of 1.8V to 3.6V. This trend should continue for economical reasons and especially by the gradual disappearance of production lines and processes for manufacturing integrated circuits capable of handling high voltages such as 5V. Moreover, in certain cases of application, a voltage has to be provided to the subassembly 2, which is greater than the one which may be directly produced from an output of a component of the subassembly 1, even when this is an output capable of providing a voltage of 5V.

Provision is made in the invention for including in the upstream interface of a subassembly 1 and, if necessary, in the downstream interface of a subassembly 2, means 43 for adapting the voltages. One skilled in the art will know how to use known solutions for carrying out such voltage adaptations. For example, on the side of the subassembly 1, provision is made for driving a conductor according to the invention from a voltage different from the one directly provided by an input/output port of a component comprising or in connection with a microprocessor, a half H-bridge structure. In certain alternative embodiments, it is advantageous to drive each of the two transistors from a half H-bridge through a dedicated input/output port. Thus, at the expense of an additional input/output port 13, it becomes very simple to handle by programming route, the three following conditions:

A conductor set to the potential of the second voltage by low impedance switching means, A conductor set to the potential of the common voltage reference by low impedance switching means, A conductor set to high impedance.

An additional input/output port 44, utilized at the input, is used in certain alternative embodiments for reading the logic state of the conductor for receiving information emitted by the subassembly 2. Further, means are provided such as a so-called clamping diode for adapting the voltage from said conductor to a voltage acceptable by the input/output port of the component.

FIG. 21 illustrates an insulated interface with a voltage adapter. Resorting to voltage adapters is also provided in so-called insulated alternatives when the voltage which may be delivered by the input/output ports is insufficient for the subassembly to be powered. FIG. 21 illustrates an exemplary embodiment of a voltage adapter from a full H-bridge, an electronic structure well-known to one skilled in the art, in particular for driving DC current motors. This structure is particularly preferred as a voltage adaptation circuit according to the invention for driving the insulation components by signals in opposite phase. This example is distinguished from that of FIG. 20 also by two additional input/outputs 13 which are utilized at the output for driving the additional half-bridge in opposite phase. Of course, as in the example of FIG. 20, there exists many possible alternatives for driving output transistors, the latter may moreover be in bipolar or FET technology, be in the form of discrete components or contained in an integrated circuit without departing from the scope of the invention. In particular, one skilled in the art will know how to adapt the proposed voltage adaptation means depending on the number of available input/output ports, depending on the voltage and current which the ports may provide, depending on the technology of the transistors of the bridge, according to the need or not for receiving information, etc.

FIG. 22 illustrates a first stand-by cut-off device implementing the invention. The application of the invention is particularly advantageous within the scope of low cost appliances, for which the main electronics 1 is at the potential of the electric mains and which are provided with a remote control 2 by wired means 3 which have to comply with the electrical safety standards in effect.

FIG. 22 illustrates a so-called stand-by cut-off device intended for saving energy which has the characteristics stated above.

In this example, the invention is applied in order to ensure the electric power supply of electronics which is comprised in the remote control, in order to transmit from the remote control towards the main electronic subassembly, commands from the button 45 and from an infrared signal receiver 46. The invention is further used so that the main subassembly controls the state of the indicator 47 which is comprised in the remote control. In this example, the invention was applied in its non-insulated alternative with two conductors, so that all the electrical safety conditions may be met with a cable which complies with the normative requirements relating to cables connected to the electric mains. Said cable comprising two 0.5 mm$^2$ wires is of a reasonable diameter, flexibility and cost, as regards the use.

FIG. 23 illustrates a second standby cut-off device implementing the invention.

This example illustrates another alternative of a stand-by cut-off device in which the invention is applied in its insulated version. Thus, the same functionalities as those of the example of FIG. 22 and the same electrical safety are ensured by means of a very thin cable with 3 conductors of a type customarily used in telephony. In addition to the aesthetical advantages of a more discreet cable, it is possible to make the cable disconnectable by at least one of its ends by using low cost connectors for example of the so-called <<modular jack>> type in order to make the assembly simpler to make and to install without any compromise on the safety.

FIG. 24 illustrates a programming unit implementing the invention.

The invention allows this programmable plug to gain in ergonomics by separating the power electronics 1 which is located in the block of plugs and the portion 2 with which the user should interact. The remote control 2 comprises selection means 45 and display means 48. Depending on the alternative embodiments and on the functional needs of the appliance, communication between the subassemblies may only be accomplished in the direction from remote control to power electronics or in both directions. The assembly is detachable by the presence of a connector 49 at least at one of the ends of the cable 3. The so-called super-insulated alternative with two or three conductors depending on the energy needs of the remote portion is particularly indicated in this example.

Of course, the application of the invention with similar means may allow the making of many appliances such as interfaces allowing control of domestic electrical appliances within the scope of an energy management system.

The invention may also be advantageously applied for connecting remote options through wired means to battery-powered portable electronic appliances such as telephones, computers, walkmans, toys, etc. The invention is also particularly indicated within the scope of electronic systems consisting of different miniaturized subassemblies distributed in clothes and/or worn by persons (Body Area Network).

Of course, the invention is not limited to the exemplary embodiments which have just been described; many adjustments may be brought to these examples without departing from the scope of the invention, notably as regards the mentioned standards which will necessarily change during the lifetime of the patent. Any combination of technical characteristics taken in the examples and in the illustrations for creating novel alternatives which are not explicitly described is located within the scope of the invention as well as any application of the invention comprising additional means and/or additional functionalities.

The invention claimed is:

1. An electronic system comprising at least two subassemblies connected through an assembly of conductors, characterized in that it comprises:

at least one subassembly comprising a microprocessor and an upstream interface means capable of supplying energy to at least one other subassembly and receiving and/or emitting information respectively from and/or towards at least one other subassembly to which it is connected;

at least one subassembly comprising a microprocessor and a downstream interface means capable of receiving energy provided by another subassembly and of emitting and/or receiving information respectively towards and/or from this other subassembly;

at least one assembly of conductors comprising three conductors for connecting the upstream and downstream interface means of two subassemblies, said assembly of conductors being capable of transferring energy from the upstream interface means towards the downstream interface means, said assembly of conductors being further capable of transmitting information between both subassemblies; and upstream interface means providing electric energy to at least one connected downstream interface means exclusively from one or from several input and/or output ports of one or several semiconductor components supplied by a DC power supply, this component or these components comprising or being in connection with at least one microprocessor.

2. The system according to claim 1, characterized in that at least one subassembly is laid out so that said at least one assembly of conductors does not require any shielding for complying with mandatory normative criteria for implementation as regards electromagnetic compatibility in emission and/or in immunity.

3. The system according to claim 1, characterized in that at least one conductor of said at least one assembly of conductors is directly or indirectly connected to at least one input and/or output port in connection with said at least one microprocessor comprised in at least one subassembly.

4. The system according to claim 1, characterized in that it further comprises at least one electronic component in order to ensure galvanic insulation between at least two subassemblies so that safety of persons is ensured according to standards in effect, the assembly of connecting conductors between said at least two subassemblies does not provide, technical characteristics capable of ensuring the safety of persons according to said standards in effect.

5. The system according to claim 4, characterized in that it comprises a plurality of electronic components mounted in series so that the safety of the persons is further ensured in the case of a fault by short-circuiting at least one of said components mounted in series.

6. The system according to claim 1, characterized in that it forms in its whole an appliance.

7. An electronic system comprising at least two subassemblies connected through an assembly of conductors, characterized in that it comprises:

at least one subassembly comprising a microprocessor and an upstream interface means capable of supplying energy to at least one other subassembly and receiving and/or emitting information respectively from and/or towards at least one other subassembly to which it is connected;

at least one subassembly comprising a microprocessor and a downstream interface means capable of receiving energy provided by another subassembly and of emitting and/or receiving information respectively towards and/or from this other subassembly;

at least one assembly of conductors comprising two conductors for connecting the upstream and downstream interface means of two subassemblies, said assembly of conductors being capable of transferring energy from the upstream interface means towards the downstream interface means, said assembly of conductors being further capable of transmitting information between both subassemblies; and upstream interface means providing electric energy to at least one connected downstream interface means exclusively from one or from several input and/or output ports of one or several semiconductor components supplied by a DC power supply, this component or these components comprising or being in connection with at least one microprocessor.

8. The system according to claim 7, characterized in that at least one subassembly is laid out so that said at least one assembly of conductors does not require any shielding for complying with mandatory normative criteria for implementation as regards electromagnetic compatibility in emission and/or in immunity.

9. The system according to claim 7, characterized in that at least one conductor of said at least one assembly of conductors is directly or indirectly connected to at least one input and/or output port in connection with said at least one microprocessor comprised in at least one subassembly.

10. The system according to claim 7, characterized in that it further comprises at least one electronic component in order to ensure galvanic insulation between at least two subassemblies so that safety of persons is ensured according to standards in effect, the assembly of connecting conductors between said at least two subassemblies does not provide, technical characteristics capable of ensuring the safety of persons according to said standards in effect.

11. The system according to claim 10, characterized in that it comprises a plurality of electronic components mounted in series so that the safety of the persons is further ensured in the case of a fault by short-circuiting at least one of said components mounted in series.

12. The system according to claim 7, characterized in that it forms in its whole an appliance.

13. An electronic system comprising at least two subassemblies connected through one conductor, characterized in that it comprises:

at least one subassembly comprising a microprocessor and an upstream interface means capable of supplying energy to at least one other subassembly and receiving and/or emitting information respectively from and/or towards at least one other subassembly to which it is connected;

at least one subassembly comprising a microprocessor and a downstream interface means capable of receiving energy provided by another subassembly and of emitting and/or receiving information respectively towards and/or from this other subassembly; and at least one conductor being capable of conducting light, at least in certain wavelengths, the light being used for transferring energy and for transmitting information, the conductor connecting the upstream and downstream interface means of two subassemblies, said conductor being capable of transferring energy from the upstream interface means towards the downstream interface means, said conductor being further capable of transmitting information between both subassemblies.

14. A method for use in a system comprising at least two subassemblies connected through at least one assembly of at most three conductors for allowing supply of energy and transmission of information, one of the assemblies being powered by a powering assembly the method comprising:

a step for transferring energy, a step for intermediate storage and/or for smoothing out the energy received by the subassembly being powered in such a way that transmission of information does not perturb the power supply of the circuits of the powered subassembly, and a step for handling a reset of the powered subassembly by the subassembly powering it, said step being executed in the subassembly powering it.

15. The method according to claim 14, characterized in that it further comprises:

a step for transmitting information by modulating a voltage from the powering subassembly to the powered subassembly, said step for transmitting information being at least partly capable of transferring energy from an emitter to a receiver of information.

16. The method according to claim 14, characterized in that it further comprises:

a step for transmitting information by modulating a voltage from the powered subassembly to the subassembly powering it.

17. The method according to claim 14, characterized in that it further comprises:

a step for detecting an operational presence of the powered subassembly, said step being executed in the subassembly powering it.

* * * * *